(12) United States Patent
Olsson et al.

(10) Patent No.: US 7,132,987 B1
(45) Date of Patent: Nov. 7, 2006

(54) ANTENNA DEVICE, AND A PORTABLE TELECOMMUNICATION APPARATUS INCLUDING SUCH AN ANTENNA DEVICE

(75) Inventors: Mats Olsson, Malmo (SE); Zhinong Ying, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/704,848

(22) Filed: Nov. 2, 2000

(30) Foreign Application Priority Data

Nov. 3, 1999 (SE) .................................... 9904002

(51) Int. Cl.
*H01Q 1/24* (2006.01)
*H01Q 1/38* (2006.01)

(52) U.S. Cl. ............... 343/702; 343/873; 455/575.7

(58) Field of Classification Search ............ 343/702, 343/795, 895, 713, 700 MS, 729, 872, 873; 455/575.7; *H01Q 1/24*
See application file for complete search history.

(56) References Cited

U.S. PATENT DOCUMENTS

| | | | | |
|---|---|---|---|---|
| 3,832,769 A | * | 9/1974 | Olyphant et al. ............. 29/830 |
| 5,499,398 A | * | 3/1996 | Kudoh et al. ............... 455/290 |
| 5,552,798 A | * | 9/1996 | Dietrich et al. ............. 343/893 |
| 5,572,227 A | * | 11/1996 | Pal et al. .................... 343/895 |
| 5,828,342 A | * | 10/1998 | Hayes et al. ................ 343/702 |
| 5,913,174 A | * | 6/1999 | Casarez et al. ............. 455/557 |
| 5,926,139 A | * | 7/1999 | Korisch ...................... 343/702 |
| 5,999,132 A | * | 12/1999 | Kitchener et al. .......... 343/702 |
| 6,039,580 A | * | 3/2000 | Sciarretta et al. ............ 439/63 |
| 6,140,966 A | * | 10/2000 | Pankinaho .................. 343/702 |
| 6,166,694 A | * | 12/2000 | Ying .......................... 343/702 |
| 6,239,765 B1 | * | 5/2001 | Johnson et al. ............. 343/702 |

FOREIGN PATENT DOCUMENTS

GB    2322011 A    *   8/1998

* cited by examiner

*Primary Examiner*—Michael C. Wimer

(57) ABSTRACT

An antenna device (10) for a portable telecommunication apparatus (1) has a first antenna (21) adapted for telecommunication in at least a first frequency band and a second antenna (22) adapted for short-range supplementary communication in a second frequency band. The first and second antennas (21, 22) are formed on a common support element (26, 27).

37 Claims, 6 Drawing Sheets

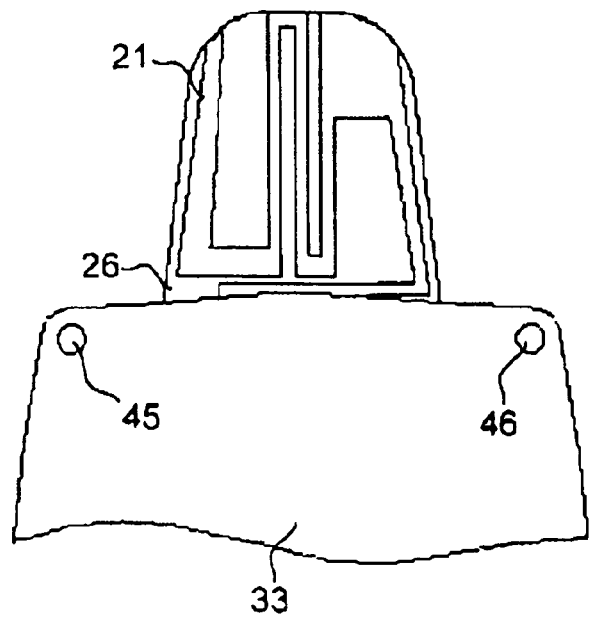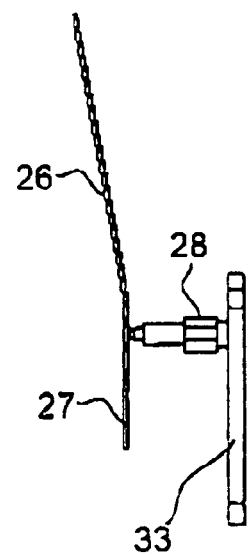
Fig 7a  Fig 7b
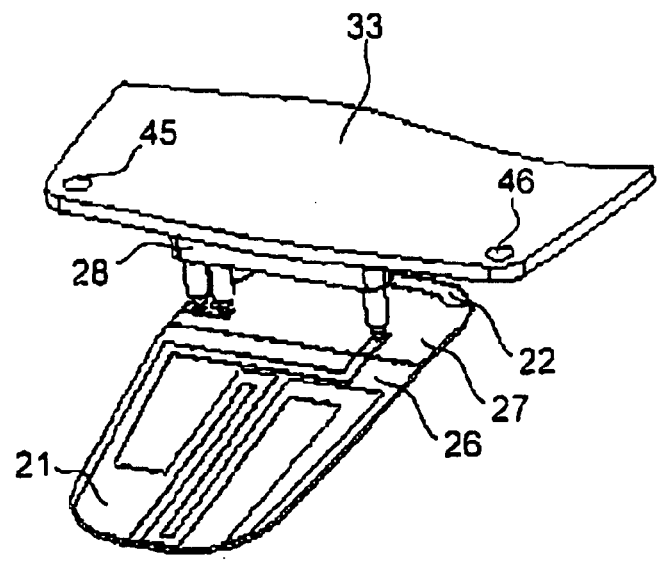
Fig 7c

ANTENNA DEVICE, AND A PORTABLE TELECOMMUNICATION APPARATUS INCLUDING SUCH AN ANTENNA DEVICE

TECHNICAL FIELD

The present invention relates co the field of radio communication and, in more particular, to an antenna device for use in a portable telecommunication apparatus of the type having a first antenna adapted for telecommunication in at least a first frequency band and a second antenna adapted for short-range supplementary communication in a second frequency band.

PRIOR ART

Examples of a portable communication apparatus as set out above are a mobile telephone, a cordless telephone, a portable digital assistant, a communicator, a paging device, an electronic payment device, or a portable navigating device. Among these, the mobile or cellular telephone is currently believed to be the most prominent in terms of market penetration and sales volumes. Therefore, for the rest of this document, reference will be made to a mobile or cellular telephone for any commercially available mobile communications network, such as GSM, UMTS or D-AMPS. However, the invention is not limited to merely a mobile telephone. On the contrary, the invention is best defined by the appended independent patent claims.

Traditionally, older mobile telephones were only capable of normal speech communication between two users through a mobile communications network and, in many situations, a public switched telephone network. Historically, mobile telephones have often been provided with a monopole antenna mounted externally to the apparatus housing of the telephone. Rod antennas, whip antennas and helix antennas are some examples of such external monopole antennas.

More recently, some mobile telephones have been provided with built-in antennae in the form of a printed pattern of conductive material. Microstrip patch antennas, meandering monopole antennas and planar inverted F-type antennas (PIFA) are examples of such antennas.

Even more recently, short-range supplementary communication services have been introduced for mobile telephones. One example of such a short-range supplementary communication service is commonly referred to as Bluetooth® and operates within an unlicensed frequency band at 2.4 GHz, which is often referred co as ISM ("Instrumental, Scientific and Medical") and is globally available. Bluetooth® is intended to provide flexible communication of data and speech between portable devices, such as mobile telephones, laptop computers, personal digital assistants (PDA), and various peripherals for these devices, such as printers, wireless headset accessories, etc.

Conventionally, the antenna for short-range supplementary communication (hereinafter referred to as "Bluetooth® antenna") is implemented as a separate unit, which is located on the secondary side of the main printed circuit board inside the mobile telephone, well separated from the cellular antenna. However, as mobile telephones get smaller and smaller in size, the available printed circuit board area also decreases. Cellular radio circuitry must be prioritized in the layout of the printed circuit board, and as a result, in existing telephones, the Bluetooth® antenna has been placed in areas on the keyboard side of the printed circuit board, where the performance in talking position is not good.

Moreover, if the Bluetooth® antenna is positioned too close to the cellular antenna on the printed circuit board, separate filtering components must be provided in order to isolate the cellular antenna from the Bluetooth® antenna so as to avoid interference.

SUMMARY OF THE INVENTION

The present invention seeks to remedy the problems set out above. In particular, it is an object of the invention to provide an antenna device for a miniaturized mobile telephone, which allows excellent performance both for a multi-band cellular antenna and a short-range supplementary communication antenna (e.g. Bluetooth®). Additionally, the desired solution is one where interference between the two antennas is avoided without a major coat penalty, and which allows low costs for development and production of antenna components.

The above objects have been achieved by an antenna device, where the cellular antenna is combined with the Bluetooth® antenna by placing the two antennas together on a common support element, such as a flexible dielectric film. Preferably, the two antennas are implemented as traces of printed conductive material. The different traces, i.e. the cellular antenna trace and the Bluetooth® antenna trace, have separated feeding and grounding points. The support element is preferably mounted in a plastic or rubber antenna housing, which is assembled in the rear cover of the telephone. The two antenna traces are preferably connected to the printed circuit board (and the cellular and Bluetooth® radio circuitry thereon) by an antenna connector having resilient contact pins for each feeding/grounding point.

In a preferred embodiment of the invention the cellular antenna trace is a triple-band printed monopole type antenna having only a single feeding point. The Bluetooth® antenna is a PIFA-type antenna having a feeding point and a grounding point.

By placing the Bluetooth® antenna in the top area of the back cover of the mobile telephone, the antenna performance gets better. Low component and development costs are available thanks to the invention. The proposed antenna device has a small size and can be encapsulated in a thin flexible rubber or plastic housing, allowing high flexibility for the designer of the mobile telephone.

These and other objects, features and advantages of the present invention will appear clearly from the following detailed disclosure of a preferred embodiment, from the enclosed drawings as well as from the appended claims.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

A presently preferred embodiment of the present invention will be described in the following detailed disclosure, reference being made to the accompanying drawings, in which FIGS. 5a–c show a front view, side view and perspective view, respectively, of the first and second antennas (the cellular antenna and the short-range supplementary communication antenna) of the antenna device, provided on a common support element, FIGS. 7a–c show a front, side and perspective view, respectively, of the antenna device shown in FIGS. 5a–c when connected to a printed circuit board in the portable telecommunication apparatus through the antenna connector shown in FIGS. 6a–c

DETAILED DISCLOSURE

Figure 1:
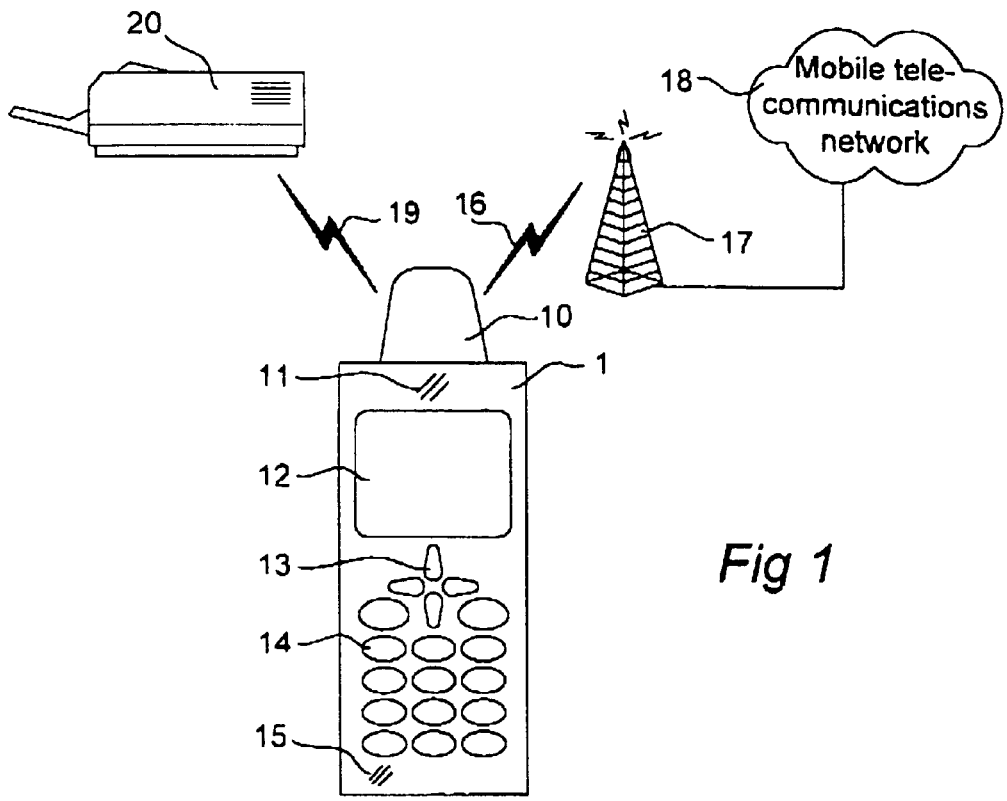
FIG. 1 is a schematic front view of a portable telecommunication apparatus with an antenna device according to the preferred embodiment, as well as an example of an environment in which it may operate.
Figure 2:
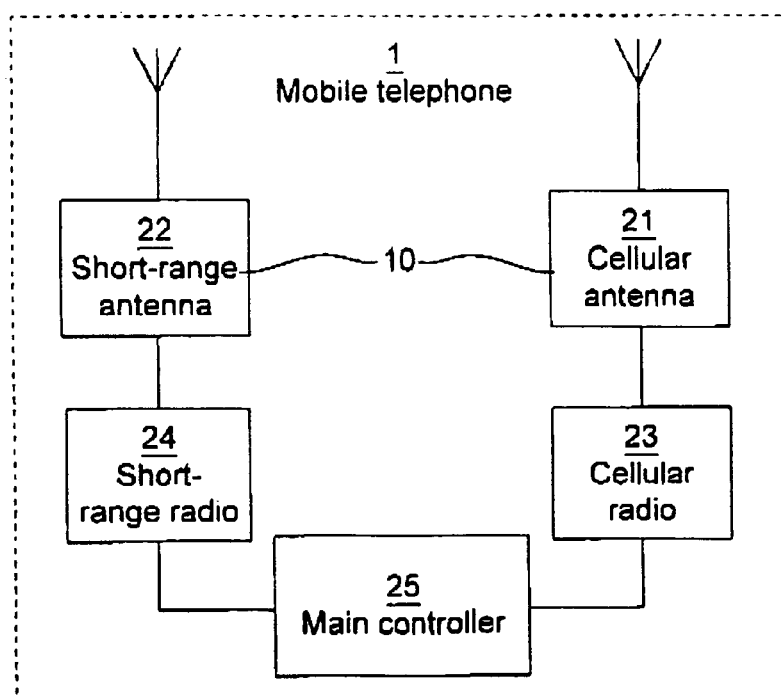
FIG. 2 is a schematic block diagram of the main components of the portable telecommunication apparatus shown in FIG. 1.
Figure 3:
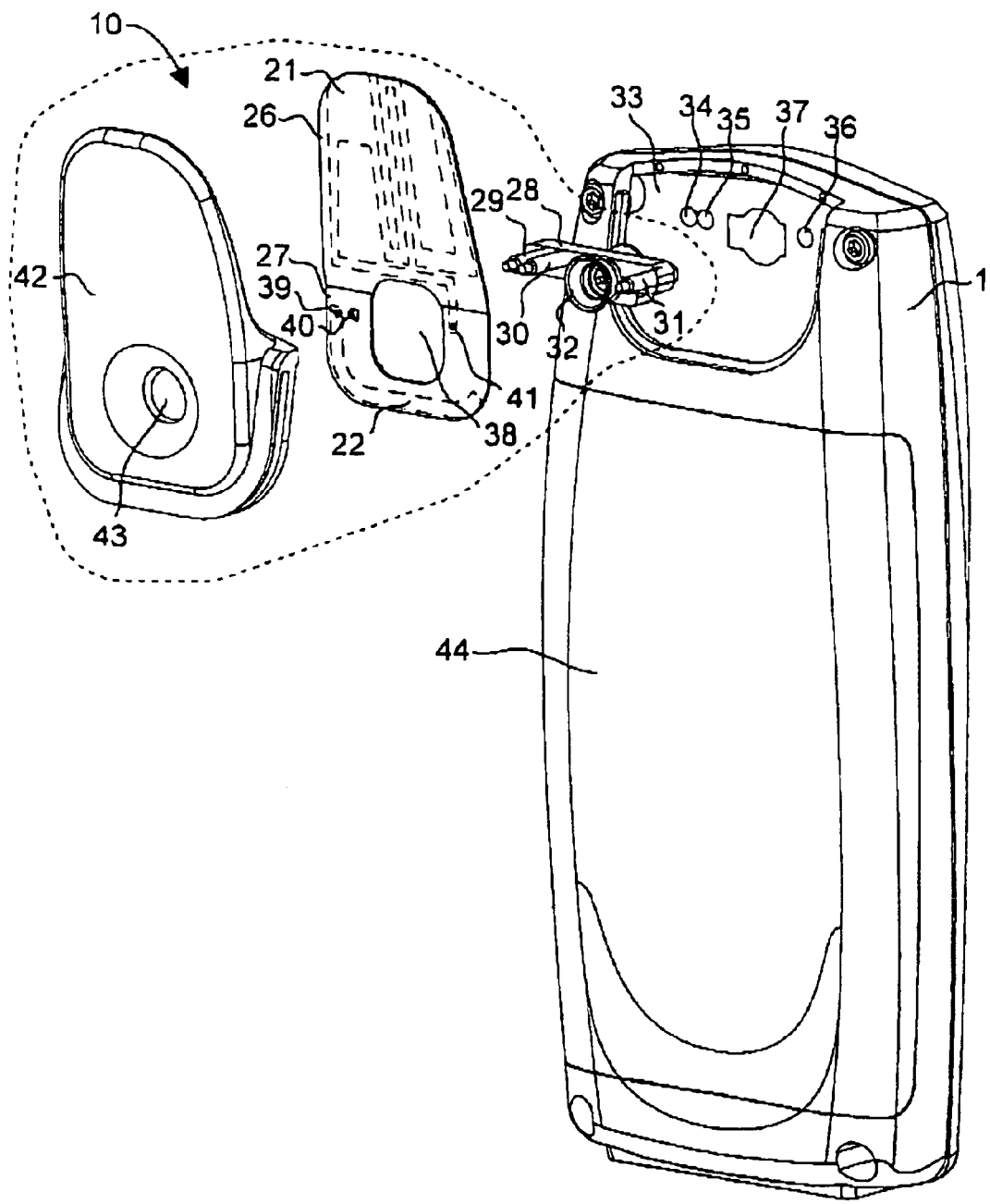
FIG. 3 is a detailed perspective rear view of the portable telecommunication apparatus in FIGS. 1 and 2, illustrating primarily the antenna device.
Figure 4:
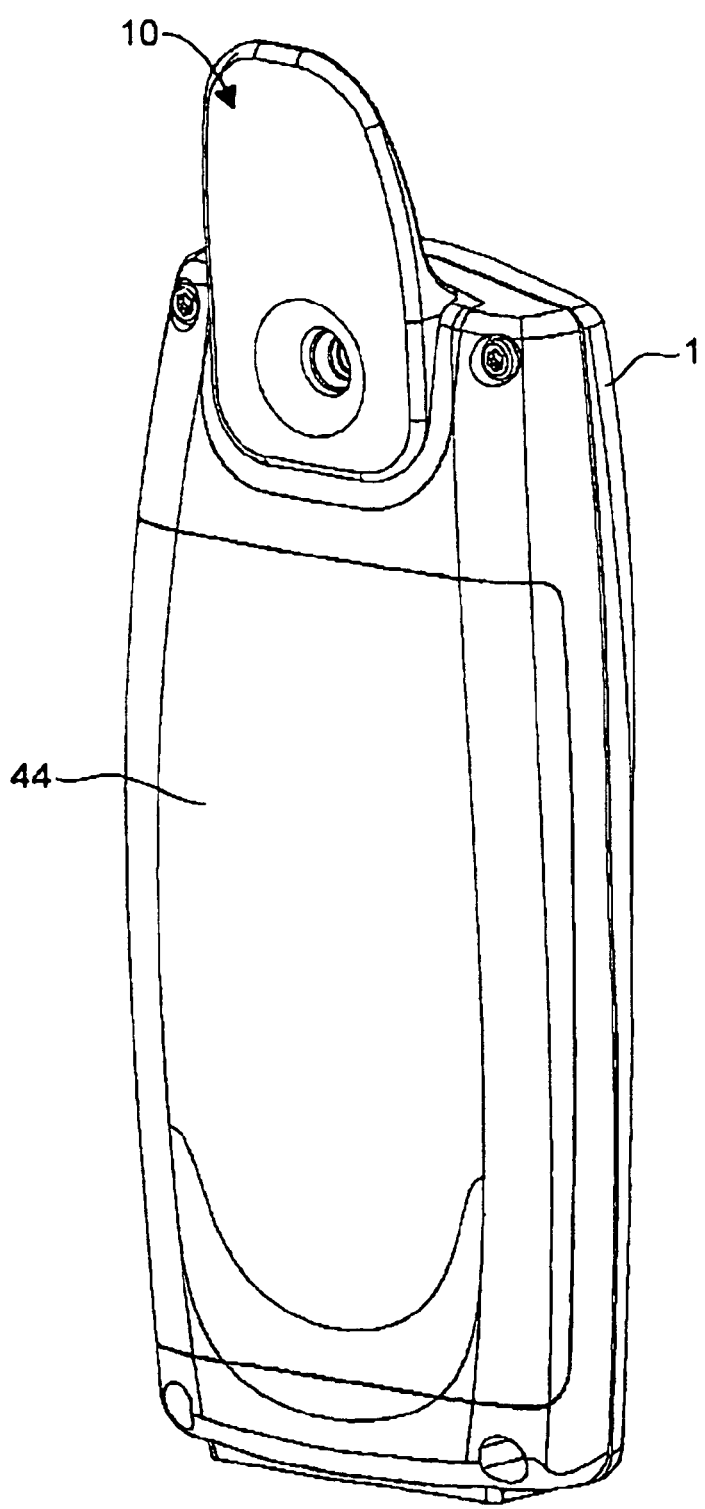
FIG. 4 is a perspective rear view corresponding to the one in FIG. 3, but where the antenna device is shown integrated with the portable telecommunication apparatus.

FIGS. 1–3 illustrate a mobile telephone 1 as a schematic front view, a block diagram and a detailed perspective rear view, respectively. As seen in the drawings, the mobile telephone 1 has an antenna device 10, which is mounted to an upper rear portion of the mobile telephone 1, immediately above a battery 44. The antenna device 10 has a cellular antenna 21, which is electrically connected to a cellular radio transceiver 23 on a printed circuit board 33 (FIG. 3) through an antenna connector 28, as will be described in more detail later.

Thus, the mobile telephone 1 may establish a wireless link 16 to a radio station (base station) 17 in a mobile telecommunications network 18, such as GSM, UMTS or D-AMPS.

The antenna device 10 moreover comprises a short-range supplementary communication antenna 22, which is referred to as the "Bluetooth® antenna" in the rest of this section. The Bluetooth® antenna 22 is electrically connected to Bluetooth® radio circuitry on the printed circuit board 33 through the antenna connector 28. In a manner generally known per se the mobile telephone 1 may establish another wireless link 19 to a peripheral device 20 through the Bluetooth® antenna 22. The peripheral device 20 is illustrated as a printer in FIG. 1 but may equally well be another mobile telephone, a laptop computer, a stationary computer, a personal digital assistant (PDA), a modem, a telefax machine, a wireless headset accessory, a home appliance, etc.

As seen in FIG. 1, the mobile telephone 1 comprises a number of conventional components, such as a loudspeaker 11, a display 12, a set of cursor keys 13, an alphanumeric keypad 14 and a microphone 15. These components are not believed to require any detailed description herein.

Before turning to the remaining figures, which will illustrate the antenna device 10 in more detail, reference is made to FIG. 2, which illustrates the above on a general level. As seen in FIG. 2, the mobile telephone 1 comprises a main controller 25, which preferably is mounted on the printed circuit board 33. The main controller 25 may be implemented by any commercially available microprocessor or another type of programmable logic circuitry. The main controller 25 is operatively connected to the cellular radio 23 and the Bluetooth® radio 24.

Referring now to FIGS. 3–7c, the antenna device 10 will be described in detail. The antenna device 10 comprises a support element 26, 27, upon which both the cellular antenna 21 and the Bluetooth® antenna 22 are mounted. In the preferred embodiment, the common support element 26, 27 is a flexible dielectric film. Suitable film materials are commercially available from Rogers Corporation, Circuit Materials Division, 100 N, Dobson Road, Chandler, Ariz.-85224, USA, or alternatively from Freudenberg, Mectec GmbH & KG, Headquarters, D-69465 Weinheim/Bergstrasse, Germany. Such flexible dielectric films are utterly thin; the typical thickness ranges from about 70 μm to about 400 μm.

Figure 5C:
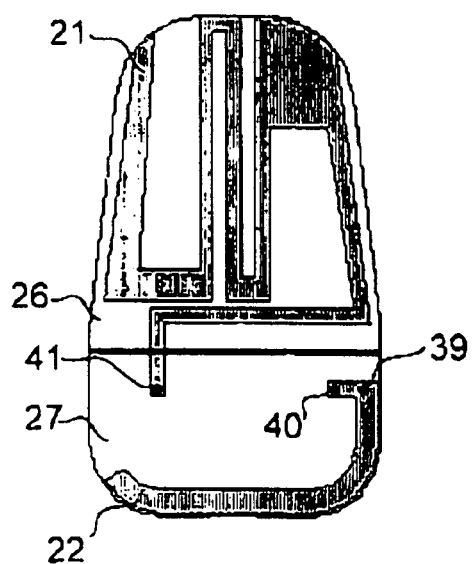
Figure 5C:
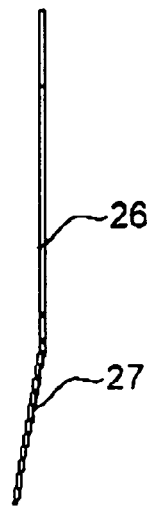
Figure 5C:
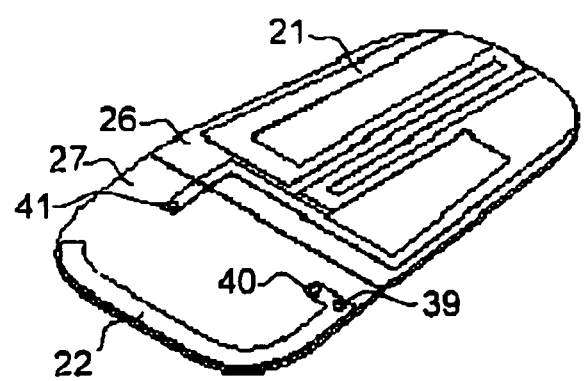
Figure 6A:
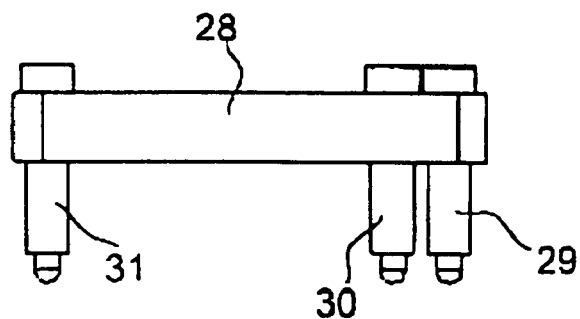
FIGS. 6a–c show a front, side and perspective view, respectively, of an antenna connector for connecting the antenna device to the portable telecommunication apparatus.
Figure 6B:
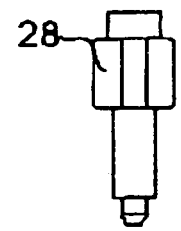
Figure 6C:
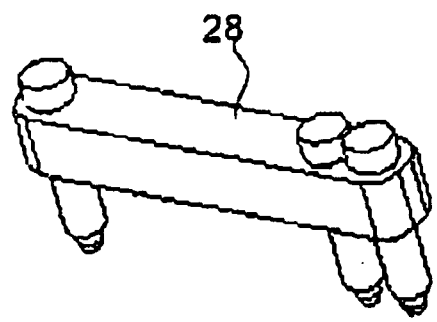

As shown in FIG. 3, the flexible dielectric film has a first portion 26, on which the cellular antenna trace 21 is printed. The flexible dielectric film also has a second portion 27, on which the Bluetooth® antenna trace 22 is printed. As shown in FIG. 5b, the two portions 26 and 27 may be arranged at a certain angle to each other. It is to be observed that the antenna traces 21 and 22 are provided on the "rear surface" of the flexible dielectric film 26, 27 as viewed in FIG. 3, i.e. the surface that faces the rear side of the mobile telephone 1. Therefore, the antenna traces 21 and 22 are only indicated by dashed lines in FIG. 3. The shapes of the cellular antenna trace 21 and the Bluetooth® trace 22 appear more clearly from FIG. 5a, FIG. 5c, FIG. 7a and FIG. 7c.

Referring back to FIG. 3, the flexible dielectric film 26, 27 is provided in an antenna housing 42 preferably made of plastic or rubber. The antenna housing 42 has a form that fits a corresponding recess in the upper rear portion of the cover of the mobile telephone 1, immediately above the battery 44.

The cellular antenna 21 is tuned to the or each frequency band that it is intended to operate in. In the preferred embodiment the cellular antenna 21 is tuned for operation in the 900 MHz GSM band and also at least one of the 1800 MHz DCS band and the 1900 MHz PCS band, preferably both of these. However, other antenna band constellations, both their number and their respective nominal frequency, are applicable to the invention. Additionally, the layout of the cellular antenna 21 may be different than the one illustrated. The exact layout of the cellular antenna 21 is to be determined by a skilled person as a matter of routine design work, due care being taken to the intended application.

The cellular antenna trace 21 forms a monopole-type antenna and has a single feeding point 41 but is not electrically grounded. The Bluetooth® antenna 22, on the other hand, has a feeding point 39 as well as a grounding point 40, which is positioned in proximity with the feeding point 39. The Bluetooth® antenna 22 is a planar inverted F-type antenna (PIFA) adapted to operate within the 2.4 GHz ISM band according to the preferred embodiment. The feeding point 41 of the cellular antenna trace 21 is electrically isolated from the feeding point 39 and grounding point 40 of the Bluetooth® antenna trace 22.

The cellular antenna trace 21 and the Bluetooth® antenna trace 22 are connected to the respective radio circuitry on the printed circuit board 33 through the antenna connector 28. More specifically, as appears particularly from FIGS. 6a–c, the antenna connector 28 has a first contact pin 31, which provides electrical contact between the feeding point 41 of the cellular antenna trace 21 and a first contact point 36 on the printed circuit board 33. In turn, the cellular radio 23 is electrically connected to the contact point 36. Moreover, the antenna connector 28 has a second contact pin 29 for connecting the feeding point 39 of the Bluetooth® trace 22 and a second contact point 34 on the printed circuit board 33, said second contact point 34 being electrically connected to the Bluetooth® radio 24. Additionally, the antenna connector 28 has a third contact pin 30, the purpose of which is to connect the grounding point 40 of the Bluetooth® antenna trace 22 with a grounding point 35 on the printed circuit board 33.

In the preferred embodiment, the contact pins 29, 30 and 31 of the antenna connector 28 are implemented as resilient pogo pins. Alternatively, the contact pins may advantageously be implemented as spring ledges, or as another type of contact members, including fixed (non-resilient) means.

The antenna connector 28 also has an external antenna connector 32 for allowing an external antenna, such as a vehicle-mounted hands free antenna, to be coupled to an external antenna input 37 on the printed circuit board 33 through an opening in the flexible dielectric film 26, 27 and a corresponding opening 43 in the antenna housing 42.

As seen in FIGS. 7*a* and 7*c*, the printed circuit board 33 has fastening openings 45 and 46 for allowing safe mounting of the printed circuit board 33 within the cover of the mobile telephone 1.

The present invention has been described above with reference to a preferred embodiment. However, other embodiments than the one referred to above are equally possible within the scope of invention, which is best defined by the appended independent claims.

The invention claimed is:

1. An external antenna device for a portable telecommunication apparatus, said external antenna device comprising:
   a first antenna adapted for telecommunication in at least a first frequency band and;
   a second antenna adapted for short-range supplementary communication in a second frequency band; and
   wherein the first and second antennas are arranged on at least one planar portion of a common support element when the external antenna device is in an operational mode, said common support element consisting of a flexible thin dielectric film provided directly in a flexible housing.

2. The antenna device as in claim 1, wherein the first and second antennas are formed as printed traces of conductive material on said flexible dielectric film.

3. The antenna device as in claim 1, wherein the first antenna comprises a first feeding point and the second antenna comprises a second feeding point, the first and second feeding points being electrically isolated from each other.

4. The antenna device as in claim 3, wherein the second antenna comprises a grounding point positioned in proximity with the second feeding point.

5. The antenna device as in claim 4, wherein the second antenna is a planar inverted F-type antenna (PIFA).

6. The antenna device as in claim 1, wherein the first antenna is a monopole antenna.

7. The antenna device as in claim 5, wherein the second antenna is adapted for communication in a 2.4 GHz frequency band.

8. The antenna device as in claim 6, wherein the first antenna is a multi-band antenna.

9. The antenna device as in claim 8, wherein the first antenna is adapted for communication in a 900 MHz frequency band and at least one of an 1800 MHz frequency band and a 1900 MHz frequency band.

10. The antenna device according to claim 1, wherein the flexible housing is made of rubber or plastic.

11. The external antenna device of claim 1, wherein a thickness of the flexible dielectric film is in the range of 70 μm to 400 μm.

12. A portable telecommunication apparatus, said portable telecommunication apparatus including an external antenna device comprising:
    a first antenna adapted for telecommunication in at least a first frequency band; and
    a second antenna adapted for short-range supplementary communication in a second frequency band; and
    wherein the first and second antennas are arranged on at least one planar portion of a common support element when the external antenna device is in an operational mode, said common support element consisting of a flexible thin dielectric film provided directly in a flexible housing.

13. The portable telecommunication apparatus as in claim 12, further comprising a printed circuit board with radio circuitry mounted thereon, and an antenna connector adapted to provide electric contact between the first and second antennas and said radio circuitry.

14. The portable telecommunication apparatus as in claim 13, wherein the first antenna comprises a first feeding point and the second antenna comprises a second feeding point, the first and second feeding points being electrically isolated from each other; wherein the second antenna comprises a grounding point positioned in proximity with the second feeding point; and wherein the antenna connector includes:
    a first resilient contact pin adapted to engage with the first feeding point of the first antenna,
    a second resilient contact pin adapted to engage with the second feeding point of the second antenna, and
    a third resilient contact pin adapted to engage with the grounding point of the second antenna.

15. The portable telecommunication apparatus as in claim 14, wherein the first, second and third resilient contact pins are pogo pins.

16. The portable telecommunication apparatus as in claim 14, wherein the first, second and third resilient contact pins are spring ledges.

17. The portable telecommunication apparatus as in any of claims 12–16, wherein the antenna device is contained in a plastic or rubber antenna housing, which is attached to an upper rear portion of the portable telecommunication apparatus.

18. The portable telecommunication apparatus as in claim 12, wherein the apparatus comprises a radio telephone.

19. The portable telecommunication apparatus as in claim 18, wherein the apparatus is adapted for use in a GSM, UMTS or D-AMPS mobile telecommunications network.

20. The portable telecommunication apparatus as in claim 18, wherein said radio telephone comprises a mobile telephone.

21. The portable telecommunications apparatus of claim 12, wherein a thickness of the flexible dielectric film is in the range of 70 μm to 400 μm.

22. A portable telecommunication apparatus, said portable telecommunication apparatus including an antenna device comprising:
    a first antenna adapted for telecommunication in at least a first frequency band; and
    a second antenna adapted for short-range supplementary communication in a second frequency band;
    the first and second antennas being formed on a common support element consisting of a flexible thin dielectric film provided directly in a flexible housing;
    wherein said apparatus further comprises a printed circuit board with radio circuitry mounted thereon, and an antenna connector adapted to provide electric contact between the first and second antennas and said radio circuitry, the first antenna comprising a first feeding point and the second antenna comprising a second feeding point, the first and second feeding points being electrically isolated from each other, and the second antenna comprising a grounding point positioned in proximity with the second feeding point;

wherein the antenna connector includes a first resilient contact pin adapted to engage with the first feeding point of the first antenna, a second resilient contact pin adapted to engage with the second feeding point of the second antenna, and a third resilient contact pin adapted to engage with the grounding point of the second antenna; and wherein the common support element has formed therein a recess located between the first feeding point and the second feeding point.

23. The portable telecommunication apparatus as in claim 22, wherein the first, second and third resilient contact pins are pogo pins.

24. The portable telecommunication apparatus as in claim 22, wherein the first, second and third resilient contact pins are spring ledges.

25. The portable telecommunication apparatus as in claim 22, where the antenna device is contained in a plastic or rubber antenna housing, which is attached to an upper rear portion of the portable telecommunication apparatus.

26. The portable telecommunication apparatus as in claim 22, wherein the first feeding point is electrically isolated from the second feeding point in that the first feeding point is located on a first side of the common support element and the second feeding point is located on a second side of the common support element opposite the first side of the common support element.

27. An external antenna device for a portable telecommunication apparatus, said external antenna device comprising:
    a first antenna adapted for telecommunication in at least a first frequency band and;
    a second antenna adapted for short-range supplementary communication in a second frequency band; and
    wherein the first antenna is arranged on a first substantially planar portion of the common support element, and the second antenna is arranged on a second substantially planar portion of the common support element, said common support element consisting of a flexible thin dielectric film provided directly in a flexible housing.

28. The external antenna device as in claim 27, wherein the first substantially planar portion of the common support element and the second substantially planar portion of the common support element are arranged at an angle with respect to each other.

29. The external antenna device as in claim 27, wherein the first and second antennas are formed as printed traces of conductive material on said flexible dielectric film.

30. The external antenna device as in claim 27, wherein the first antenna comprises a first feeding point and the second antenna comprises a second feeding point, the first and second feeding points being electrically isolated from each other.

31. The external antenna device as in claim 30, wherein the second antenna comprises a grounding point positioned in proximity with the second feeding point.

32. The external antenna device as in claim 27, wherein the second antenna is a planar inverted F-type antenna (PIFA).

33. The external antenna device as in claim 27, wherein the first antenna is a monopole antenna.

34. The external antenna device as in claim 27, wherein the second antenna is adapted for communication in a 2.4 GHz frequency band.

35. The external antenna device as in claim 27, wherein the first antenna is a multi-band antenna.

36. The external antenna device as in claim 27, wherein the first antenna is adapted for communication in a 900 MHz frequency band and at least one of an 1800 MHz frequency band and a 1900 MHz frequency band.

37. The external antenna device of claim 27, wherein a thickness of the flexible dielectric film is in the range of 70 μm to 400 μm.

* * * * *